United States Patent [19]
Sanchez et al.

[11] Patent Number: 5,829,879
[45] Date of Patent: Nov. 3, 1998

[54] TEMPERATURE SENSOR

[75] Inventors: Hector Sanchez, Cedar Park; Jose Alvarez, Leander, both of Tex.

[73] Assignee: Motorola, Inc., Schaumburg, Ill.

[21] Appl. No.: 772,710

[22] Filed: Dec. 23, 1996

[51] Int. Cl.$^6$ .................................................. G01K 7/00
[52] U.S. Cl. ............................................................ 374/178
[58] Field of Search .................................... 374/163, 170, 374/178; 257/470; 327/512, 583

[56] References Cited

U.S. PATENT DOCUMENTS

| | | | |
|---|---|---|---|
| 3,679,992 | 7/1972 | Yerman ................................. | 374/178 |
| 3,719,797 | 3/1973 | Andrews, Jr. et al. .............. | 374/178 |
| 3,791,217 | 2/1974 | Stout et al. ........................... | 374/178 |
| 4,730,228 | 3/1988 | Einzinger et al. .................... | 257/470 |
| 4,875,131 | 10/1989 | Leipold et al. ..................... | 374/178 |
| 5,451,892 | 9/1995 | Bailey .................................... | 327/113 |
| 5,487,127 | 1/1996 | Bertoluzzi et al. ................. | 331/69 |

OTHER PUBLICATIONS

"Micropower CMOS Temperature Sensor with Digital Output," Anton Bakker and Johan H. Juijsing, *IEEE Journal of Solid-State Circuits*, vol. 32, No. 7, Jul. 1996, pp. 933–937.

*Primary Examiner*—G. Bradley Bennett
*Attorney, Agent, or Firm*—Lee E. Chastain; Jeffrey G. Toler

[57] ABSTRACT

A temperature sensor (1800) incorporates two diodes (1802, 1804). The voltage difference across each diode is a linear function of temperature. The voltage difference between the two diodes is also a function of the ratio of their respective sizes. These relationships can be used to build a sensor that is inexpensive, reliable, and whose process variance is predictable.

15 Claims, 13 Drawing Sheets

TEMPERATURE SENSOR

RELATED APPLICATIONS

The present patent application is a member of the following group of patent applications related to one another by subject matter: "Data Processor with Circuit for Regulating Instruction throughput and Method of Operation," to Alexander et al., attorney docket No. SC-90,194A, "Temperature Sensor," to Sanchez et al., attorney docket No. SC-90,267A, and "Thermal Management Unit and Method of Operation," to Gerosa et al., attorney docket No. SC-90,342A, all filed concurrently herewith.

FIELD OF THE INVENTION

The present invention generally relates to electronic circuits, and more specifically to circuits for sensing temperature.

BACKGROUND OF THE INVENTION

Temperature sensors are devices used to detect the temperature of a device that contains the sensor or is physically located near to the sensor. In this way, the operation of a circuit may be controlled as a function of its temperature. Such control may be advantageous in the case of applications that require heat dissipating devices, and for other purposes. For instance, it may be necessary to incorporate a heat sink an integrated circuit, or to force air over the integrated circuit if it the integrated circuit has the potential of ever exceeding the passive cooling ability of the integrated circuit. With a temperature sensor, it may be possible to avoid these instances and, thus, to avoid the requirement of a heat sink, fan, etc. altogether.

Known thermal sensors have traditionally relied on complex discrete solutions. For instance, known thermal sensors incorporate resistors, capacitors, operational amplifiers, and ring oscillators to detect changes in temperature. Unfortunately, these devices may be incompatible with modem, complementary metal oxides semiconductor (CMOS) manufacturing processes. And, these solutions may require complex control circuitry to operate.

Other known solutions are not fully integrated. A fully integrated solution is one in which the sensing element resides on the same integrated circuit whose temperature is of interest. Instead, prior solutions have located a sensing element near to the device of interest. This solution is more expensive and less responsive to temperature changes. These non-integrated solutions are less responsive to temperature changes due to the thermal resistance between the external sensor and the device of interest.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
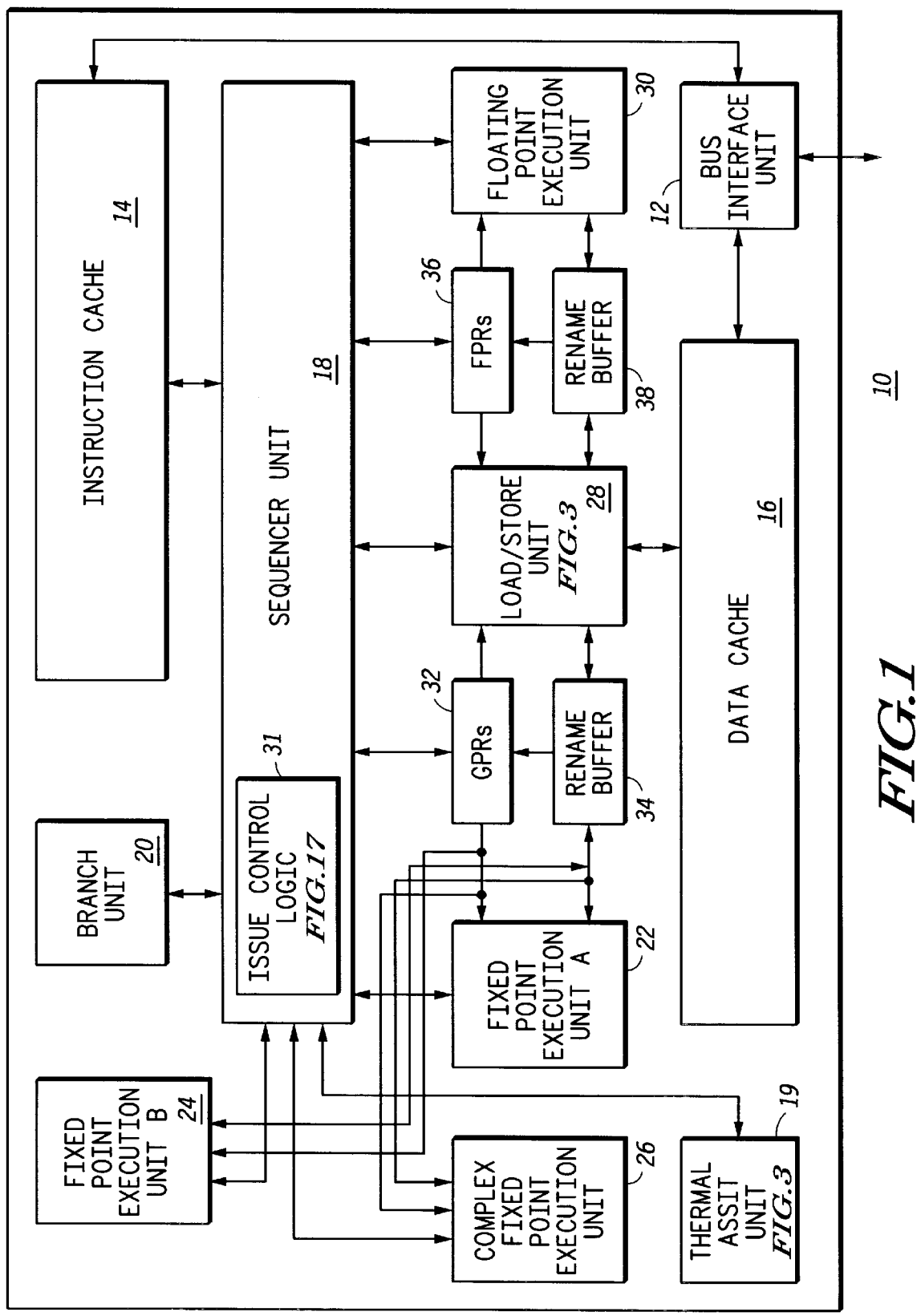
FIG. 1 depicts a block diagram of a data processor constructed in accordance with the present invention.

FIG. 1 depicts a block diagram of a data processor 10 constructed in accordance with the present invention. Data processor 10 contains a thermal sensor (depicted in FIGS. 3 and 18) that incorporates two diodes. The voltage drop across the two diodes varies linearly with temperature. Further, the gain of the temperature sensor is improved by the appropriate selection of the size of the two diodes. The disclosed temperature sensor may be integrated into a complimentary metal oxide process (CMOS) device. The disclosed temperature sensor does not require any process dependent or complex elements to function.

For convenience, the present invention is described according to the following Outline. No limitation should be accorded to any particular heading.

I. Overview of the Data Processor
  A. Hardware description
  B. Operational description
  C. Instruction pipeline description
II. Thermal Assist Unit
  A. Hardware description
  B. Register set
  C. Control unit operational description
  D. Operating examples
    i. power management scenario
    ii. temperature measurement
III. Instruction Issue Control
  A. Hardware description
  B. Operational description
IV. Thermal Sensor
  A. Hardware description
  B. Operational description
  C. Second embodiment I. Overview of the Data Processor
  A. Hardware description Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a thermal assist unit (TAU) 19, branch unit 20, a fixed point execution unit A 22, a fixed point execution unit B 24, a complex fixed point execution unit 26, a load/store execution unit 28, and a floating point execution unit 30. TAU 19 is more fully described below in connection with FIG. 3. Sequencer unit 18 also contains an issue control logic portion 31. Issue control logic is more fully described below in connection with FIG. 17.

Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 30 and load/store execution unit 28 read and write their results to a floating point architectural register file 36, (labeled FPRs and hereafter FPR file) and to a second rename buffer 38.

B. Operational description

The operation of data processor 10 without the disclosed invention is briefly described. In general, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them from a main memory system external to data processor 10 (not shown).

Sequencer unit 18 dispatches the individual instructions of the sequence of programmed instructions to the various execution units 19, 20, 22, 24, 26, 28 and 30. Sequencer unit 18 also reserves an entry in either rename buffer 34 or 38 in which to temporarily store the result, if any, of each instruction. Both rename buffers are first-in-first-out ("FIFO") queues.

Each of the execution units performs one or more instructions of a particular class of instructions. The particular class of instructions of each execution unit is indicated by the name of the execution unit. For instance, TAU 19 executes instructions associated with the sensing of temperature. Fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, or FPR file 36 at completion time and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12. Load/store unit 28 is described below in connection with FIGS. 3 through 14.

The operation of data processor 10 with the disclosed invention is described below in connection with FIGS. 2 through 16. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

C. Instruction pipeline description

Figure 2:
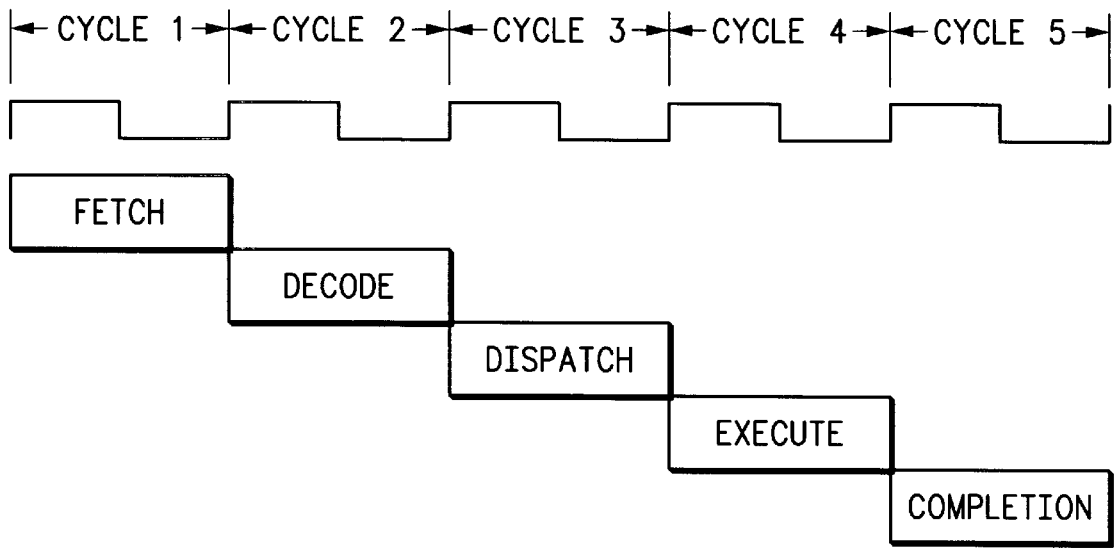
FIG. 2 depicts a timing diagram of an instruction executed by the data processor depicted in FIG. 1.

FIG. 2 depicts a timing diagram of an instruction executed by data processor 10 depicted in FIG. 1. In the depicted embodiment, each instruction is broken into five discrete steps: fetch, decode, dispatch, execute, and completion.

In the fetch stage, memory management circuitry (not shown) within instruction cache 14 retrieves one or more instructions beginning at a memory address identified by sequencer unit 18 or by branch unit 20 in the prior clock cycle.

In the decode stage, instructions are decoded by sequencer unit 18 into a number of control signals for use by subsequent stages. During this stage, sequencer unit 18 determines which execution unit will execute each instruction.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched or, if one or more operands are not yet available, for supplying a tag identifying the rename buffer entry to which the operand will be written. Each one of the execution units stores its particular instruction in a reservation station until it receives all the necessary operand information to perform the instruction.

In the execute stage, each particular execution unit receives all (or some) of the necessary operand information and is therefore able to begin performing its programmed instruction. Results, if any, are returned either to first rename buffer 34 or second rename buffer 38, respectively, for integer and floating point results. As a first power savings strategy, data processor automatically powers down those execution units that are not performing work. This dynamic power management mode is described in U.S. Pat. No. 5,420,808, which is hereby incorporated by reference.

In the completion stage, sequencer unit 18 updates the architectural register files with the result of a particular instruction stored in a rename buffer after every instruction preceding the particular instruction has so updated the architectural register file. The completion stage also updates all other architectural states in the machine after every instruction preceding the particular instruction has so updated the architectural state.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

II. Thermal Assist Unit

A. Hardware description

Figure 3:
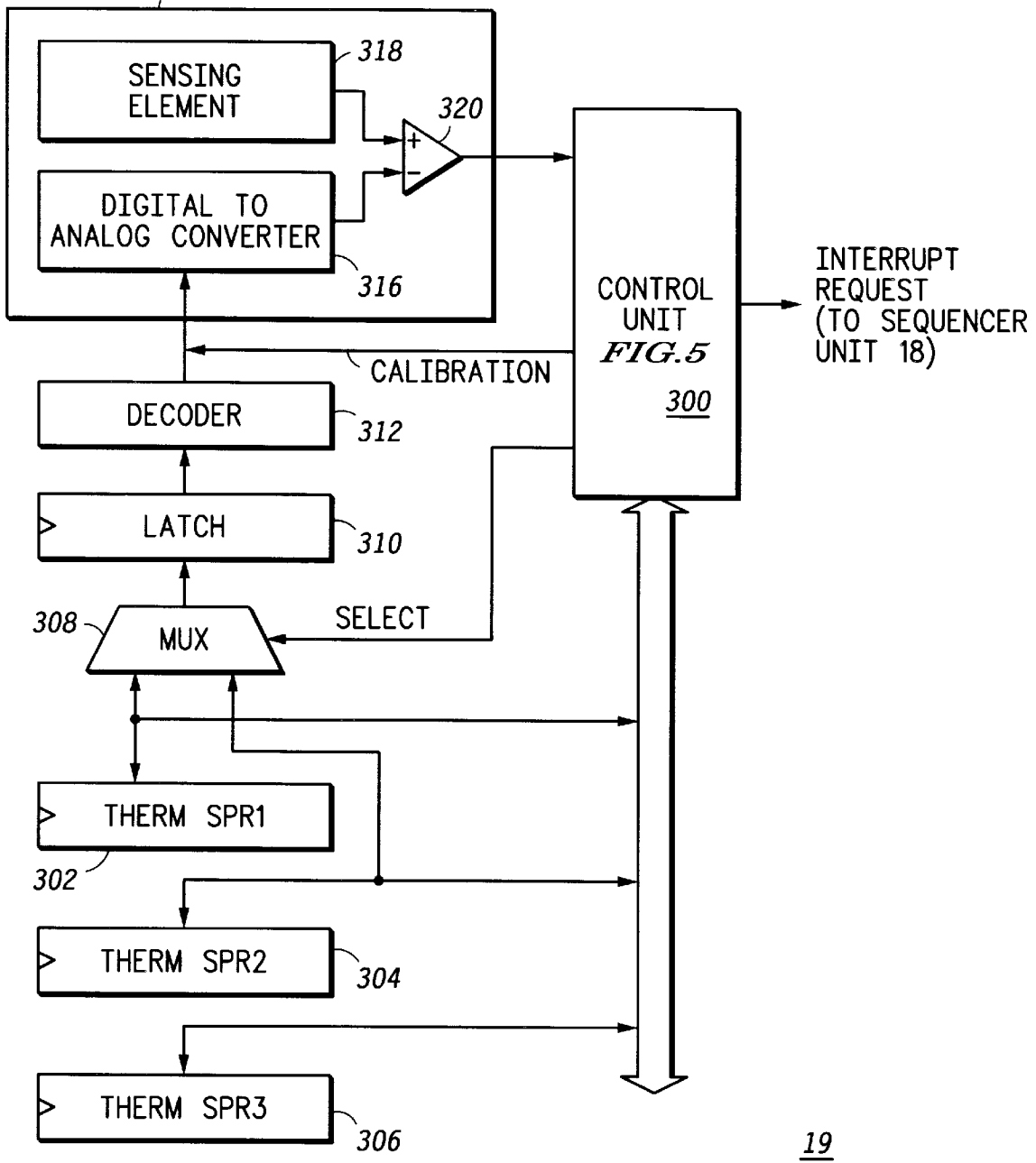
FIG. 3 depicts a block diagram of the thermal assist unit depicted in FIG. 1.

FIG. 3 depicts a block diagram of thermal assist unit ("TAU") 19 depicted in FIG. 1. A control unit 300 is coupled to three user programmable registers 302, 304, and 306. Control unit 300 is described below in connection with FIG. 5. Registers 302, 304, and 306 store three control/data values THERM SPR1, THERM SPR2, and THERM SPR3, respectively. (THERM and SPR are abbreviations for thermal and special purpose register, respectively.) THERM SPR1, THERM SPR2, and THERM SPR3 are described below in connection with FIG. 4. An output of register 302 and register 304 are coupled to a first input and to a second input of a 2:1 multiplexer, (MUX) 308. An output of MUX 308 is latched each clock cycle by a latch 310. An output of latch 310 is mapped into a easily usable set of control signals by a decoder 312. An output of decoder 312 is coupled to a temperature sensor 314. An output of temperature sensor is coupled to control unit 300.

Conceptually, temperature sensor 314 contains a digital to analog converter 316, a temperature sensing element 318 and a voltage gain stage 320. Voltage gain stage 320 main by the first stage of an operational amplifier, may by a sense amplifier, etc. A plus (+) terminal of voltage gain stage 320 receives the output current or voltage from sensing element 318. The particular current or voltage output by sensing element 318 is dependent upon the temperature of data processor 10. A minus (−) terminal of voltage gain stage 320 receives the voltage or current output by digital to analog converter 316. The particular current or voltage output by digital to analog converter 316 is dependent upon the value output by MUX 308. Control unit 300 selects this value. Voltage gain stage 320 indicates a positive voltage level if the current or voltage level output by sensing element 318 is greater than the current or voltage level output by digital to analog converter 316. Temperature sensor 314 is described below in connection with FIG. 18.

In operation, TAU 19 causes temperature sensor 314 to compare a threshold value stored in either THERM SPR1 or THERM SPR2 against the temperature sensed by sensing element 318. TAU 19 can then take one or more steps in response to that comparison. The particular threshold and the one or more steps taken after comparison are determined by the values programmed into THERM SPR1, THERM SPR2, and THERM SPR3.

B. Register set

Figure 4:
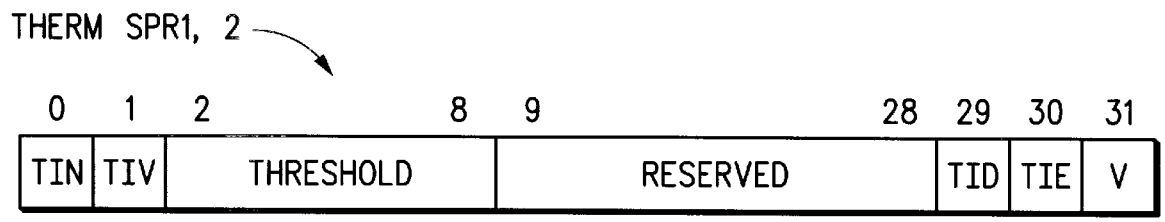
FIG. 4 depicts a conceptual view of a portion of a register set of the data processor depicted in FIG. 1.
Figure 4:
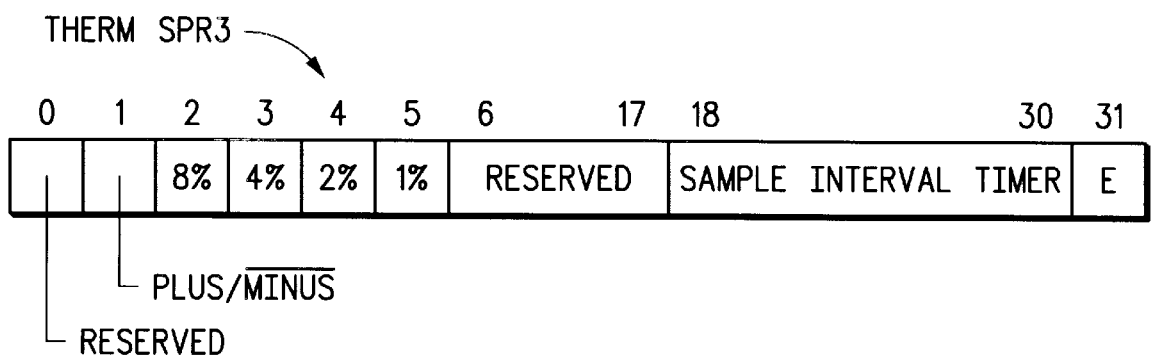

FIG. 4 depicts a conceptual view of a portion of a register set of the data processor depicted in FIG. 1. These registers are visible to the user of data processor 10 to control the power and thermal management functions described herein.

THERM SPR1 and THERM SPR2 contain the fields V, TIE, TID, THRESHOLD, TIV, and TIN.

V (SPR valid) is a one bit field. When V=1, then the remaining data in the corresponding special purpose register is valid. When V=0, then the remaining data in the corresponding special purpose register is invalid.

TIE (thermal interrupt enable) is a one bit field. When TIE=1, then control unit 300 may generate an interrupt under certain circumstance. These circumstances are described below in connection with the TID field. When TIE=0, then control unit 300 will not generate an interrupt.

TID (thermal interrupt direction) is a one bit field. When TID=0, then control unit 300 may generate an interrupt if the sensed temperature is greater than the THRESHOLD temperature. When TID=1, then control unit 300 may generate an interrupt if the sensed temperature is less than the THRESHOLD temperature.

THRESHOLD is a seven bit field. The contents of this field are applied to one input of MUX 308 for comparison against the temperature sensed by sensing element 318.

TIV (thermal interrupt valid) is a one bit field. Control unit 300 sets this field to 1 to indicate a valid TIN field.

TIN (thermal interrupt bit) is a one bit field. Control unit 300 sets this bit after receiving a temperature comparison. The meaning of the contents of this field is determined by the TID field. For instance, if TID=0, and TIN=1, then the sensed temperature was greater the THRESHOLD temperature. Conversely, if TID=1, and TIN=1, then the sensed temperature was less than the THRESHOLD temperature.

THERM SPR3 contains the fields E, SAMPLE INTERVAL TIMER, 1%, 2%, 4%, 8%, and PLUS/$\overline{\text{MINUS}}$.

E (enable) is a one bit field. When E=1, then control unit 300 may perform a comparison as specified by THERM SPR1, by THERM SPR2, by both registers, or by neither as indicated individually by those registers. When E=0, then control unit 300 will not perform any comparison.

SAMPLE INTERVAL TIMER is a thirteen bit field. The contents of this field indicate the number of clock cycles control unit 300 waits before sampling the output of temperature sensor 314 for interrupt generation, TIN setting, etc.

1%, 2%, 4%, 8% (calibrating bits) are each one bit fields. Collectively, they set an offset to sensing element 318 to compensate for the performance variations of sensing element 318 caused by manufacturing or CMOS process variations.

C. Control unit operational description

Figure 5:
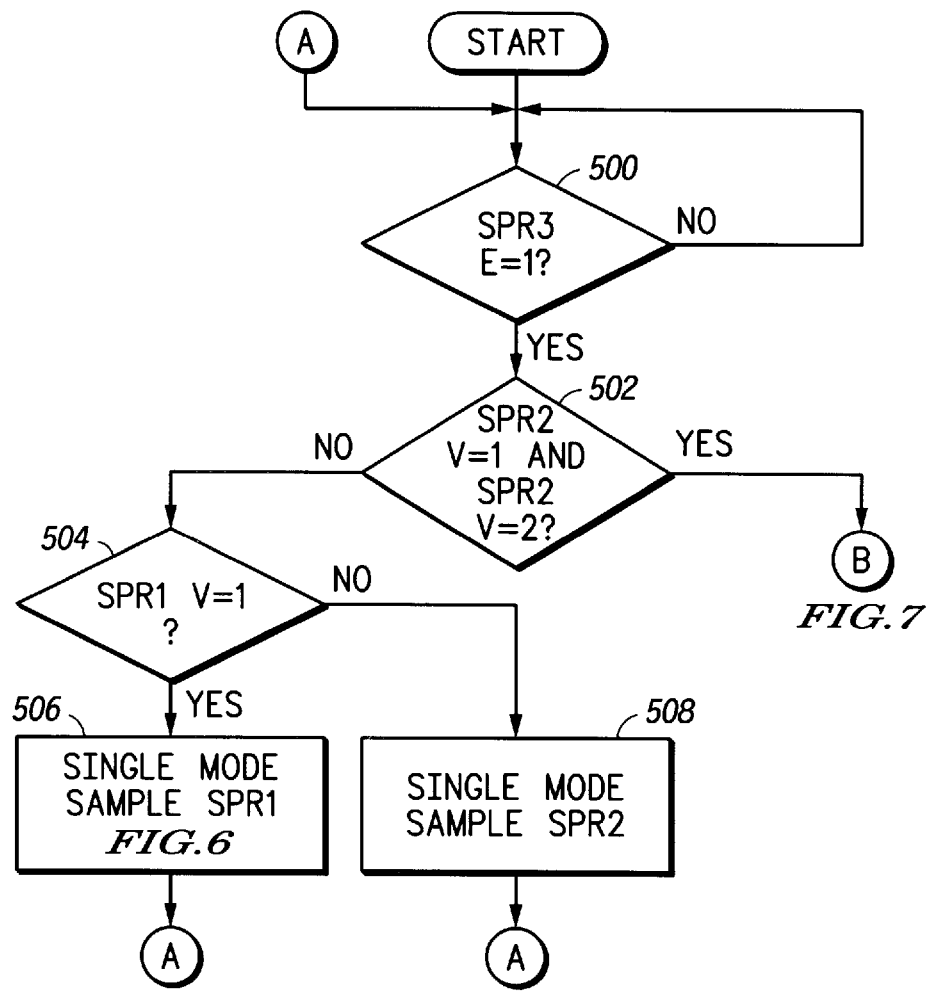
FIG. 5 depicts a flow control diagram of the operation of the control unit depicted in FIG. 3.
Figure 7:
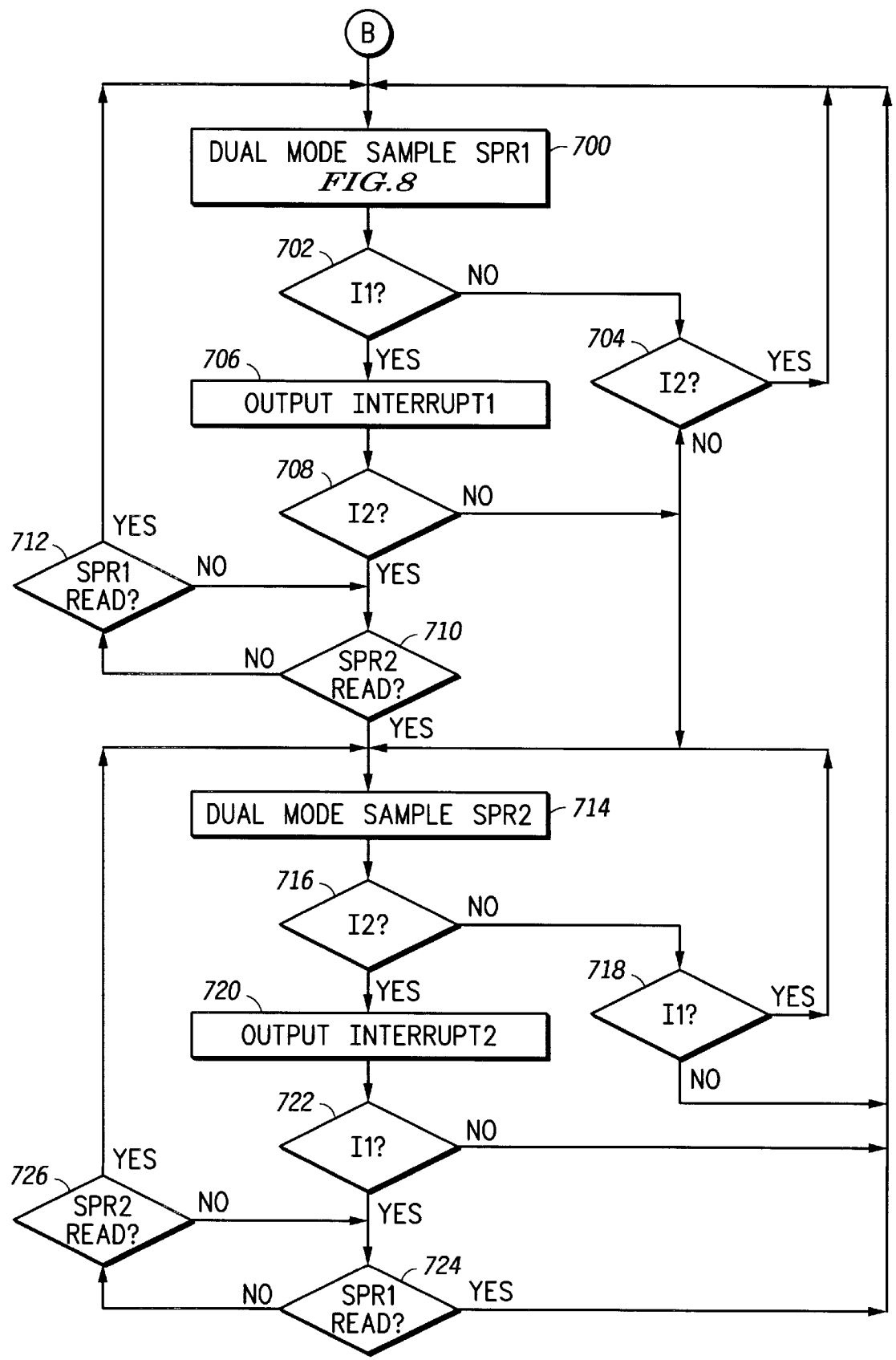
FIG. 7 depicts a continuation of the flow control diagram depicted in FIG. 5.

FIG. 5 depicts a flow control diagram of the operation of control unit 300 depicted in FIG. 3. Control unit 300 operates in one of three modes: idle, single threshold comparison, or dual threshold comparison. In the idle state, control unit 300 performs no operations. The idle state is designated by setting THERM SPR3 E=0. It should be understood that control unit 300 will return to this state whenever the user sets THERM SPR3 E=0. In the single threshold comparison mode, control unit 300 applies one of the two THRESHOLD fields to temperature sensor 318. Control unit 300 will continue to make periodic comparisons unless it is programmed to generate an interrupt. If control unit 300 is programmed to generate an interrupt, then it will pause until the interrupt has been cleared by the user through an interrupt routine. The single comparison mode is depicted in the left-hand portion of FIG. 5. In the dual threshold comparison mode, control unit 300 sequentially applies both THRESHOLD fields to temperature sensor 318. Control unit 18 will continue to make periodic comparisons of both thresholds unless it is programmed to generate an interrupt for one or both of the thresholds. If control unit 300 is programmed to generate one or two interrupts, then it will pause making measurements of one or both of the thresholds until the one interrupt or until the two interrupts have been cleared by the user. The dual comparison mode is depicted in FIG. 7.

Continuing with FIG. 5, control unit 300 begins in an idle state. Control unit 300 first determines if any operation is programmed by examining the E field, a step 500. If the THERM SPR3 E bit is set, then control unit 300 continues to a step 502. If the enable bit is not set, then control unit 300 returns to the idle state. Continuing with step 502, control unit 300 determines if a single comparison operation or if a dual comparison operation is specified. A single comparison is specified if one but not both of THERM SPR1 V=1 or THERM SPR2 V=1. A dual comparison is specified if both of THERM SPR1 V=1 or THERM SPR2 V=1. If a single comparison operation is specified, then control unit 300 enters the single comparison mode and executes a step 504. If a dual comparison operation is specified, then control unit 300 enters the dual comparison mode. The dual comparison mode is described below in connection with FIG. 7.

Continuing with step 504, control unit 300 determines if the programmed comparison is specified by the THERM SPR1 register. A comparison with THERM SPR1 is specified by THERM SPR1 V=1. If the comparison is to be performed with the data stored in THERM SPR1, then control unit 300 executes the SINGLE MODE SAMPLE SPR1 block, a step 506. Step 506 is described below in connection with FIG. 6. After executing step 506, control unit 300 returns to the idle state and step 500. If the comparison is to be performed with the data stored in THERM SPR2, then control unit 300 executes the SINGLE MODE SAMPLE SPR2 block, a step 508. Step 508 is identical to step 506 with the mapping of each SPR1 field to the equivalent SPR2 field. After executing step 508, control unit 300 returns to the idle state and step 500.

Figure 6:
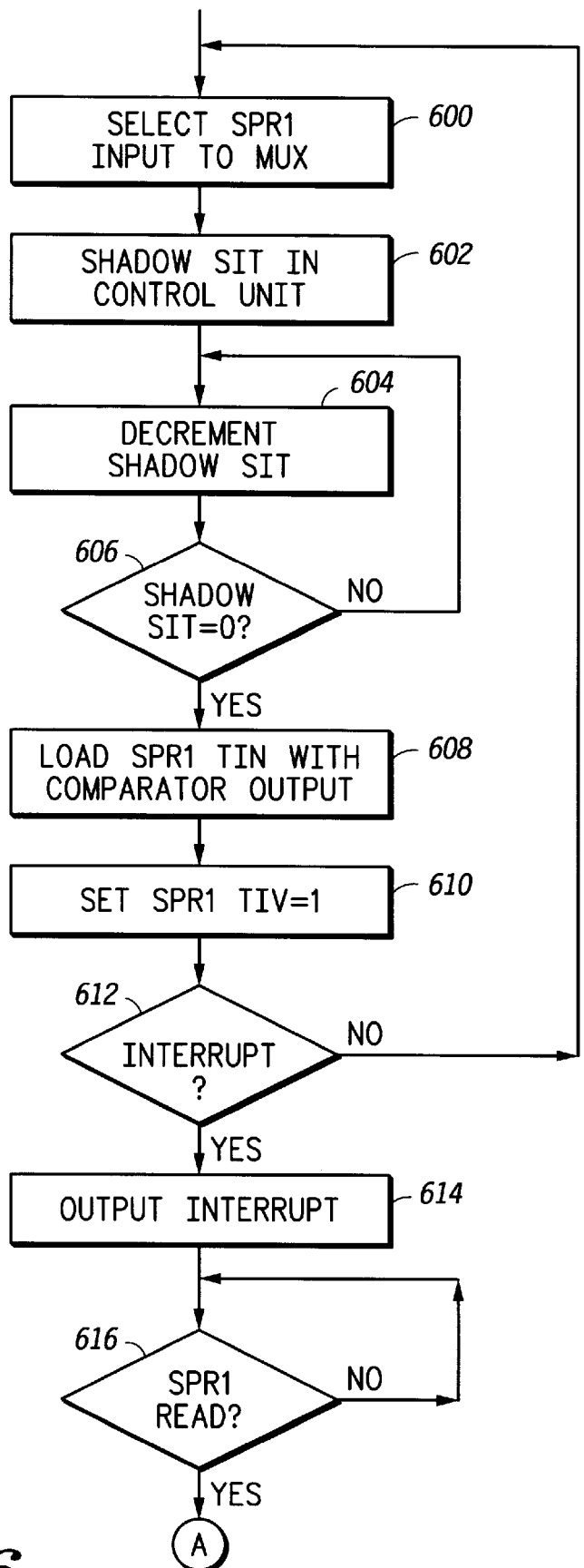
FIG. 6 depicts a flow control diagram of a step from the flow control diagram depicted in FIG. 5.

FIG. 6 depicts a flow control diagram of step 506 from the flow control diagram depicted in FIG. 5. Step 506 itself begins with a step 600. In step 600, control unit 300 causes MUX 308 to output the THERM SPR1 THRESHOLD field to latch 310. Next, control unit 300 shadows the contents of the THERM SPR3 TIN field into an internal counter (not shown), a step 602. Control unit 300 decrements its counter, a step 604, and tests whether the counter has reached zero, a step 606. If the counter has not reached zero, then control unit 300 continues looping through steps 604 and 606. Control unit 300 loads the appropriate value into the THERM SPR1 TIN field when it finally reaches zero, a step 608. If TID=0 and the output of voltage gain stage 320 equals one, then control unit 300 stores one to the TIN field. If TID=1 and the output of voltage gain stage 320 equals zero, then control unit 300 stores one to the TIN field. Otherwise, control unit 300 stores zero to the TIN field. Next, control unit 300 sets the THERM SPR1 TIV bit to one, a step 610.

Control unit 300 determines if an interrupt is enabled for THERM SPR1, a step 612. As described above, the V and TID fields in THERM SPR1 determine whether an interrupt is generated. If an interrupt is to be generated, then control unit 300 outputs the interrupt to sequencer unit 18, a step 614. Sequencer unit 18 can then invoke an exception handler routine to modify the operation of data processor 10. For instance, data processor may be configured to run at a lower frequency, may be turned off completely, or may have the number of instructions fetched from instruction cache 14 limited. This latter strategy, "instruction throttling," is described below in connection with FIG. 17. If no interrupt is enabled for THERM SPR1, then control unit 300 returns to step 800 and makes another temperature comparison.

Continuing with step 614, control unit 300 determines if the user has read the results of the previous comparison, a step 616. If the user has not read the contents of THERM SPR1, then control unit 300 loops on itself until the interrupt is read by the user. This strategy ensures that an important temperature comparison result will not be over written by a subsequent comparison. Control unit 300 returns to step 500 (shown in FIG. 5) once it determines that the user has read the interrupt. In the preferred embodiment, the execution of any move to THERM SPR1 or move to THERM SPR2 instruction causes the TIV field in the corresponding special purpose register to be reset to zero. Therefore, control unit 300 determines if the interrupt has been read by determining if THERM SPR1 TIV=0.

FIG. 7 depicts a continuation of the flow control diagram depicted in FIG. 5. Specifically, FIG. 7 depicts the dual comparison mode of operation. Control unit 300 begins this mode by executing the DUAL MODE SAMPLE SPR1 block, a step 700. Step 700 is described below in connection with FIG. 8. Control unit 300 determines if an interrupt is enabled for THERM SPR1, a step 702. As described above, the V and TID fields in THERM SPR1 determine whether an interrupt is generated. If an interrupt is to be generated, then control unit 300 outputs the interrupt to sequencer unit 18, a step 706. Sequencer unit 18 can then invoke an exception handler routine to modify the operation of data processor 10. if no interrupt is enabled for THERM SPR1, then control unit 300 determines if it has previously generated an interrupt for the comparison associated with THERM SPR2, a step 704. If control unit 300 determines that it has generated an interrupt for THERM SPR2, then it returns to step 700 and makes another temperature comparison for THERM SPR2.

Returning to step 706, control unit 300 also determines if it has previously generated an interrupt for the comparison associated with THERM SPR2, a step 708. If control unit 300 has generated an interrupt for THERM SPR2 (and for THERM SPR1), then it determines if the user has read the THERM SPR2 interrupt, a step 710. If the user has not read the interrupt associated with THERM SPR2, then control unit 300 determines if the user has read the interrupt associated with THERM SPR1, a step 712. If the user has read neither interrupt, then control unit 300 loops through steps 710 and 712 until the user reads one or the other. If the user reads THERM SPR1 first, then control unit returns to step 700 to make a second comparison specified by THERM SPR1. Instead, if the user reads THERM SPR2 first, then control unit executes a DUAL MODE SAMPLE SPR2 block, a step 714. As described above, this strategy of not overwriting results that trigger interrupts ensures that important information is not lost. However, control unit 300 will continue to make comparisons that do not generate interrupts.

Returning to step 708, if control unit 300 determines that there is no interrupt associated with THERM SPR2, then it proceeds to make a comparison specified by THERM SPR2, step 714. This may be the first comparison associated with THERM SPR2 or may be a subsequent sample.

Continuing with step 714, control unit 300 executes a DUAL MODE SAMPLE SPR2 block. Step 714 is identical to step 700 with the mapping of each SPR1 field to the equivalent SPR2 field. Control unit 300 determines if an interrupt is enabled for THERM SPR2, a step 716. As described above, the V and TID fields in THERM SPR2 determine whether an interrupt is generated. If no interrupt is enabled for THERM SPR2, then control unit 300 determines if it has previously generated an interrupt for the comparison associated with THERM SPR1, a step 718. If control unit 300 determines that it has also generated an interrupt for THERM SPR1, then it returns to step 714 to make another temperature comparison for THERM SPR2. If control unit 300 determines that it has not generated an interrupt for THERM SPR1, then it returns to step 700 to make another temperature comparison for THERM SPR1.

In step 716, if an interrupt is to be generated, then control unit 300 outputs the interrupt to sequencer unit 18, a step 720. Sequencer unit 18 can then invoke an exception handler routine to modify the operation of data processor 10. Next, control unit 300 also determines if it has previously generated an interrupt for the comparison associated with THERM SPR1, a step 722. If control unit 300 has generated an interrupt for THERM SPR1 (and for THERM SPR2), then it determines if the user has read the THERM SPR1 interrupt, a step 724. If the user has not read the interrupt associated with THERM SPR1, then control unit 300 determines if the user has read the interrupt associated with THERM SPR2, a step 726. If the user has read neither interrupt, then control unit 300 loops through steps 724 and 726 until the user reads one or the other. If the user reads THERM SPR1 first, then control unit returns to step 700 to make a second comparison specified by THERM SPR1. Instead, if the user reads THERM SPR2 first, then control unit executes a DUAL MODE SAMPLE SPR2 block, a step 714.

Figure 8:
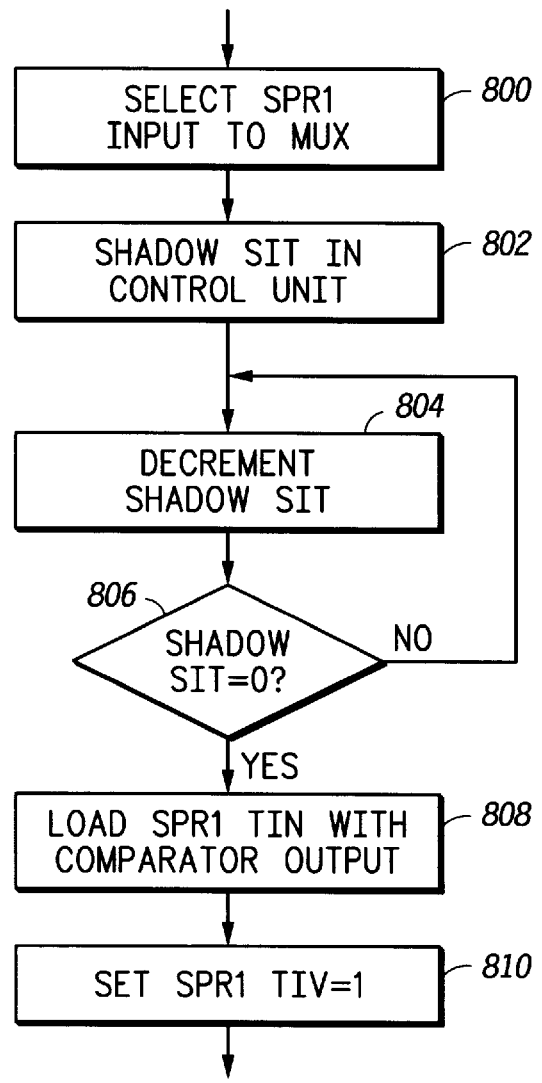
FIG. 8 depicts a flow control diagram of a step from the flow control diagram depicted in FIG. 7.

FIG. 8 depicts a flow control diagram of step 706 from the flow control diagram depicted in FIG. 7. Step 706 begins with a step 800. In step 800, control unit 300 causes MUX 308 to output the THERM SPR1 THRESHOLD field to latch 310. Next, control unit 300 shadows the contents of the THERM SPR3 TIN field into an internal counter (not shown), a step 802. Control unit 300 decrements its counter, a step 804, and tests whether the counter has reached zero, a step 806. If the counter has not reached zero, then control unit 300 continues looping through steps 804 and 806. Control unit 300 loads the appropriate value into the THERM SPR1 TIN field when it finally reaches zero, a step 808. The determination of the appropriate value is described above in connection with step 608, FIG. 6. Finally, control unit 300 sets the THERM SPR1 TIV bit to one, a step 810.

D. Operating examples i. power management scenario

Figure 9:
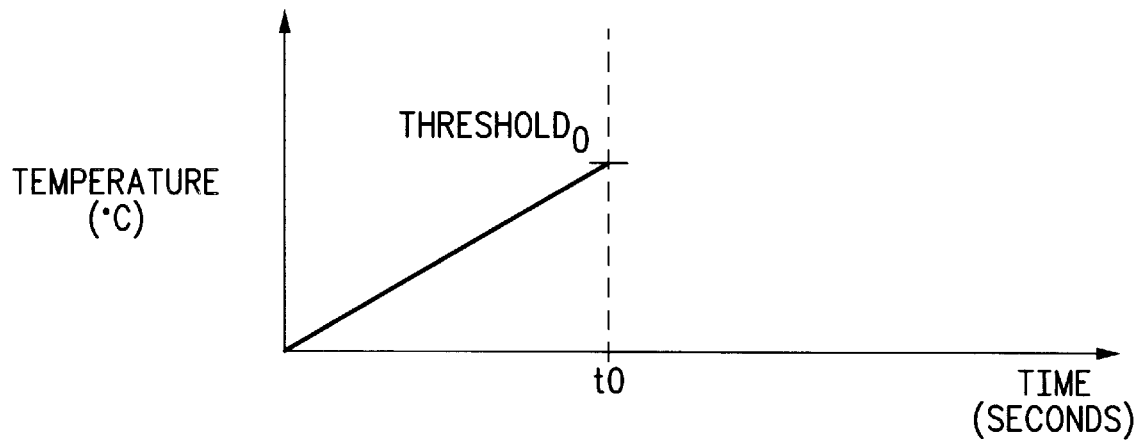
FIGS. 9, 10, and 11 depict graphical views of two temperature scenarios useful in explaining the operation of the invention.
Figure 10:
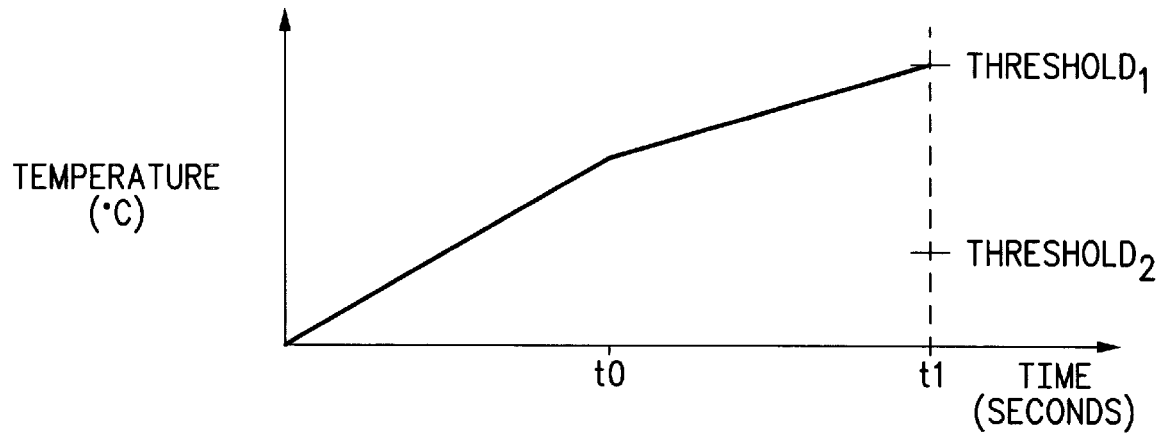
Figure 11:
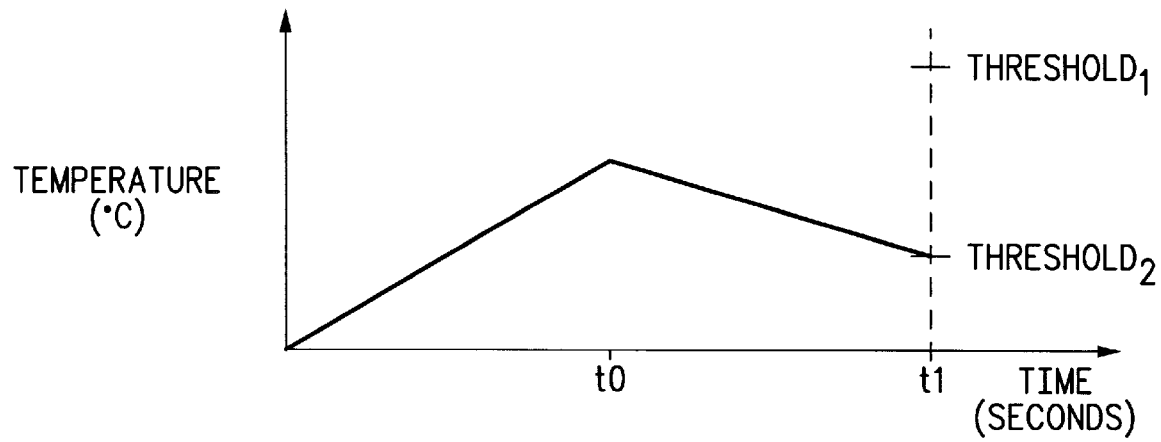

FIGS. 9, 10, and 11 depict graphical views of two temperature scenarios useful in explaining the operation of the invention. In FIG. 9, the temperature of data processor 10 is increasing as a function of time due to a warm environment, an increased workload, or both. TAU 19 is programmed to detect this occurrence and allow corrective measures to be taken. In FIG. 10, the temperature of data processor 10 continues to increase despite the actions of TAU 19. Data processor 10 will take additional corrective measures. Alternately, FIG. 11 indicates that the temperature of data processor 10 decreases after taking the initial corrective measures. Data processor 10 may resume normal operation. The procedures necessary to respond to the scenarios are described below in connection with FIG. 12.

Figure 12:
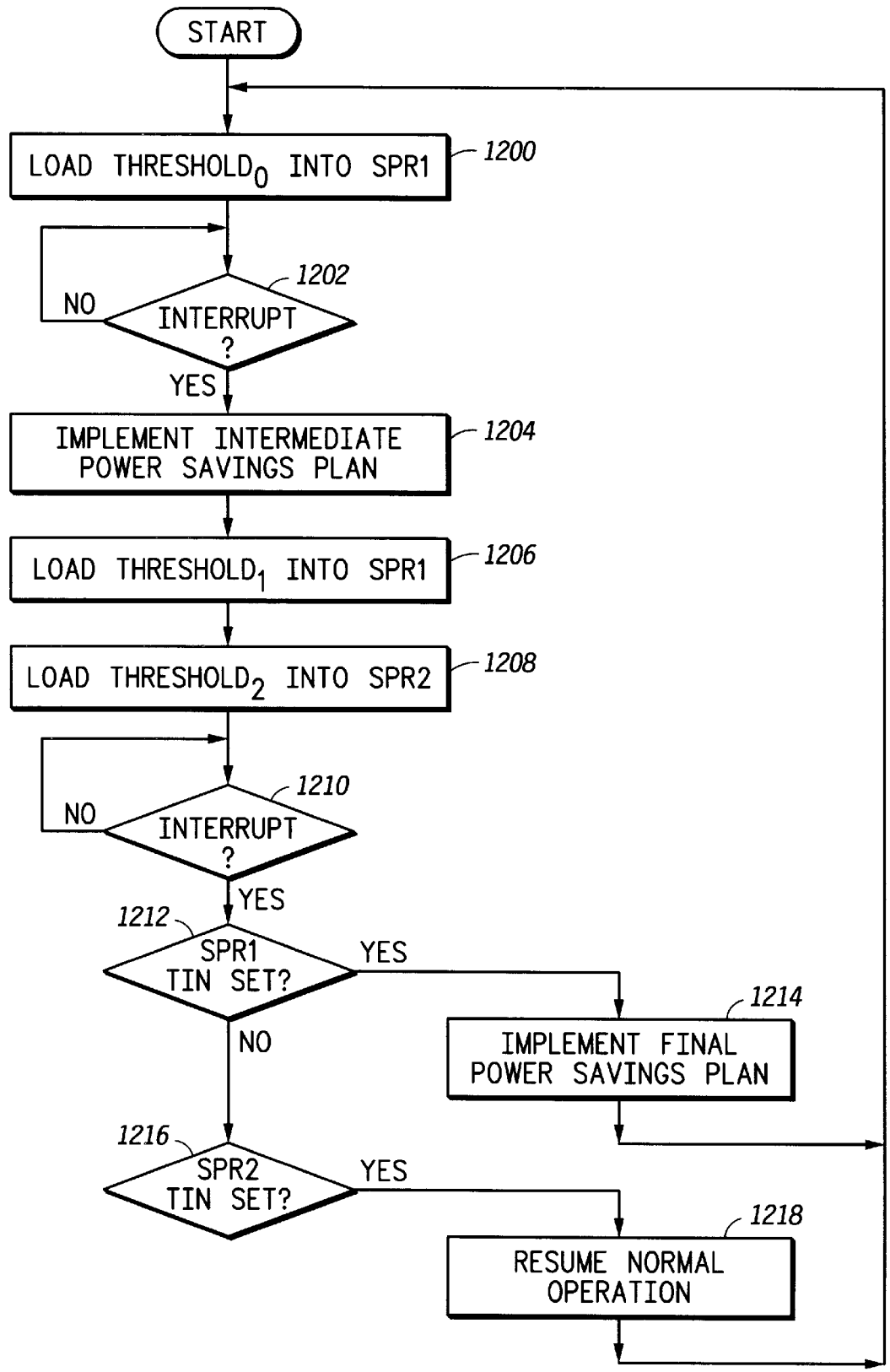
FIG. 12 depicts a flow control diagram of a method of operating the data processor depicted in FIG. 1.

FIG. 12 depicts a flow control diagram of a method of operating the data processor depicted in FIG. 1. In the preferred embodiment, the steps depicted in FIG. 12 are part of the operating system (OS) of data processor 10. Accordingly, these steps are stored in main memory (not shown). Alternately, these steps could be integrated into control unit 300 or into read only memory (ROM) elsewhere within data processor 10.

Assuming that TAU 19 is under the control of an OS, then the OS writes a baseline temperature threshold, THRESHOLD$_0$ into THERM SPR1, enables an interrupt on a temperature reading greater than THRESHOLD$_0$, and sets THERM SPR3=1, a step 1200. Data processor 10 then waits until control unit 300 generates an interrupt, a step 1202. It should be understood that data processor 10 typically will be executing instructions while control unit 300 is periodically comparing its temperature to THRESHOLD$_0$. As depicted in FIG. 9, it is assumed for purposes of illustration that the temperature of data processor 10 reaches and exceeds THRESHOLD$_0$ at a certain time, to. At this point, control unit 300 generates an interrupt. Data processor 10 implements an intermediate power savings plan, a step 1204. Such an intermediate power savings plan could be a throttling of instruction issue, a reduction in clock frequency, or the entrance into a static power down mode.

Next, the OS will load THRESHOLD$_1$ into THERM SPR1 and THRESHOLD$_2$ into THERM SPR2, a step 1206 and a step 1208, respectively. The OS also enables an interrupt on a temperature reading greater than THRESHOLD$_1$, enables an interrupt on a temperature reading less than THRESHOLD$_2$, and sets THERM SPR3=1. Data processor 10 then waits until control unit 300 generates an interrupt, a step 1210. Again, it should be understood that data processor 10 typically will be executing instructions while control unit 300 is periodically comparing its temperature to THRESHOLD$_1$ and to THRESHOLD$_2$.

As depicted in FIG. 10, it is assumed for purposes of illustration that the temperature of data processor 10 reaches and exceeds THRESHOLD$_1$ at a certain time, $t_1$. Such a scenario could occur when data processor 10 was in an especially hot environment. Therefore, control unit 300 generates an interrupt based on THERM SPR1. In this case, the OS reads THERM SPR1 TIN and determines that the temperature of data processor 10 is greater than THRESHOLD$_1$, a step 1212. At this point, data processor 10 implements a final power savings plan, a step 1214. Such a final power savings plan could be a further throttling of instruction issue, could be a further reduction in clock frequency, or could be the cessation of all computing activities.

Conversely in FIG. 11, it is assumed for purposes of illustration that the temperature of data processor 10 decreases and, in fact, falls below THRESHOLD$_2$ at the certain time, t1. Such a scenario could occur if the intermediate power savings plan successfully reduced the power consumption of data processor 10. Therefore, control unit 300 generates an interrupt based on THERM SPR2. In this case, the OS reads THERM SPR2 TIN and determines that the temperature of data processor 10 is less than THRESHOLD$_2$, a step 1216. At this point, data processor 10 resumes normal operation, a step 1218. Both steps 1214 and 1218 return to step 1200.

ii. temperature measurement

Figure 13:
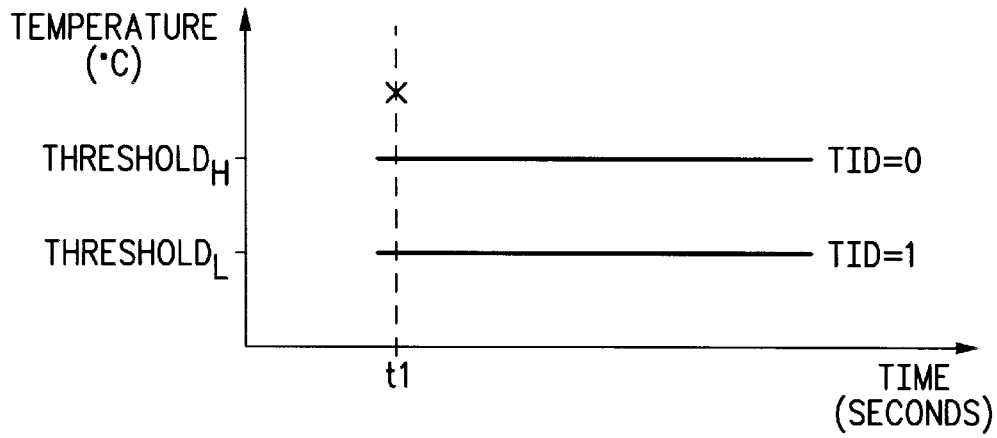
FIGS. 13, 14, and 15 depict graphical views of three temperature scenarios useful in explaining the operation of the invention.
Figure 14:
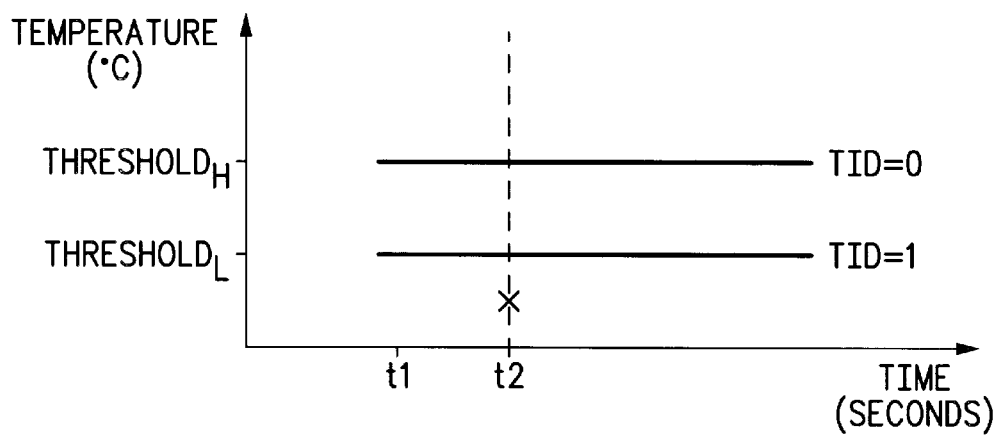
Figure 15:
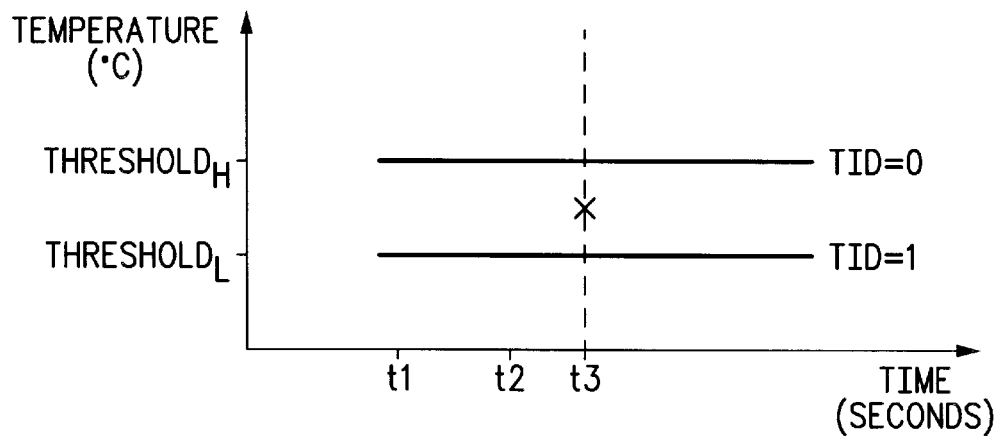

FIGS. 13, 14, and 15 depict graphical views of three temperature scenarios useful in explaining the operation of the invention. One application of TAU 19 is to determine the temperature of data processor 10. The temperature of data processor 10 may be determined using a single special purpose register, slowly incrementing or decrementing the THRESHOLD field until an appropriate interrupt is generated. However, the temperature of data processor 10 may be efficiently determined with two simultaneous temperature comparisons permitted by two special purpose registers. Such a method is described below in connection with FIG. 16.

In general, a window is created using the THRESHOLD fields in THERM SPR1 and THERM SPR2. The temperature of data processor 10 is sensed to determine if it is within that window. The window is then narrowed if the actual temperature is within the window. Conversely, the window is widened if the actual temperature is outside of the window.

FIG. 13 depicts the scenario in which the actual temperature is outside and above the temperature range created by THRESHOLD$_H$ and THRESHOLD$_L$. Here, THERM SPR1 TID=0, causing THERM SPR1 to generate an interrupt. In this case, THRESHOLD$_H$ is increased.

FIG. 14 depicts the scenario in which the actual temperature is also outside and below the temperature range created by THRESHOLD$_H$ and THRESHOLD$_L$. Here, THERM SPR2 TID=1, causing THERM SPR2 to generate an interrupt. In this case, THRESHOLD$_L$ is decreased.

FIG. 15 depicts the scenario in which the actual temperature is within the temperature range created by THRESHOLD$_H$ and THRESHOLD$_L$. Here, neither special purpose register causes an interrupt. In this case, THRESHOLD$_H$ is decreased and/or THRESHOLD$_L$ is increased.

Figure 16:
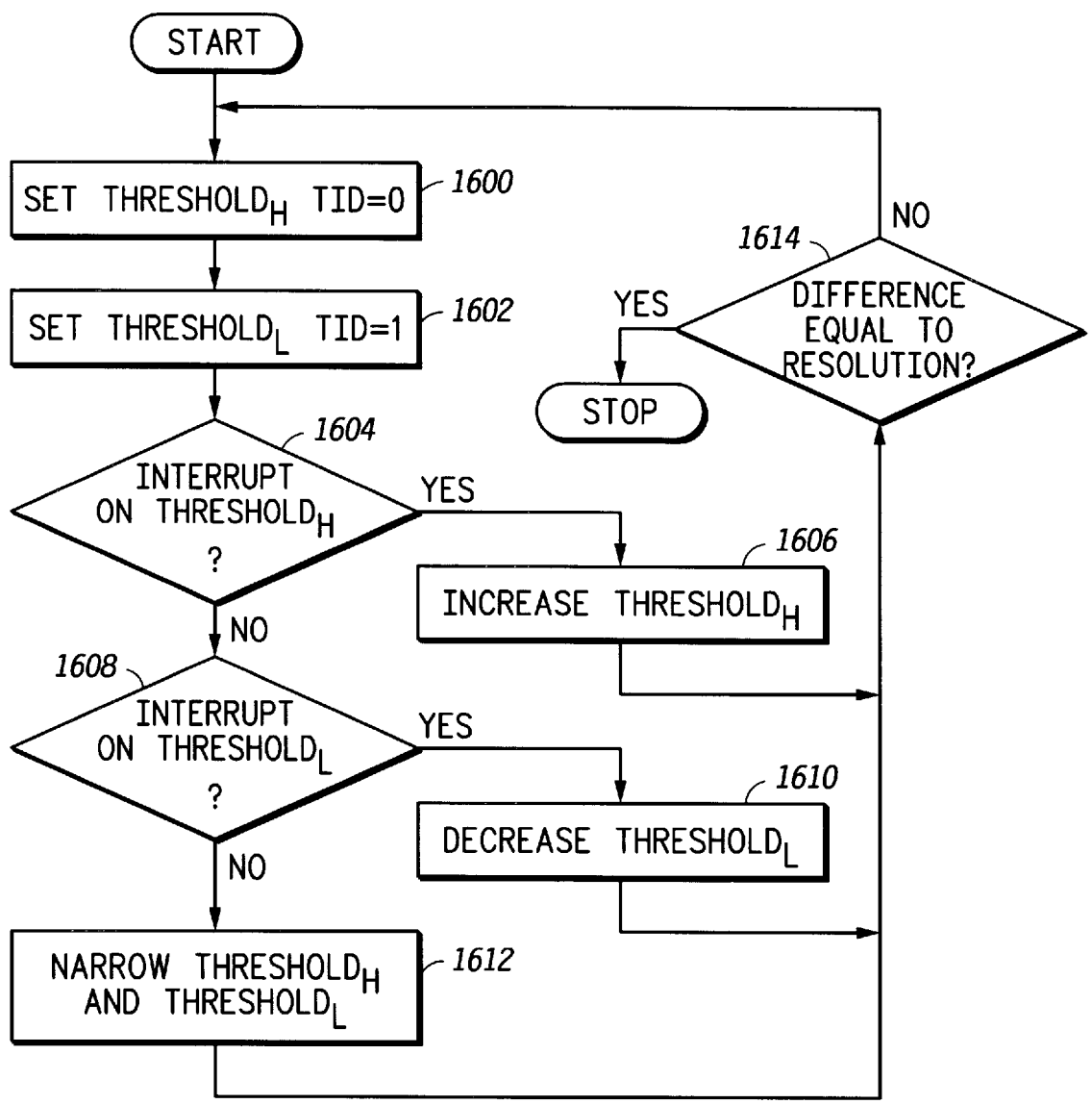
FIG. 16 depicts a flow control diagram of a method of operating the data processor depicted in FIG. 1.

FIG. 16 depicts a flow control diagram of a method of operating the data processor depicted in FIG. 1. Specifically, FIG. 16 depicts a method of determining the temperature of data processor 10 as described above in connection with FIGS. 13, 14, and 15. Again, the method depicted may be implemented in a number of ways to accomplish the same result. For purposes of illustration, an OS is assumed to perform the functions depicted in the FIG. 16. The OS loads THRESHOLD$_H$ into THERM SPR1 and enables an interrupt on a temperature reading greater than THRESHOLD$_H$ (TIE=1, TIN=0), a step 1600. Also, the OS loads THRESHOLD$_L$ into THERM SPR2 and enables an interrupt on a temperature reading less than THRESHOLD$_L$ (TIE=1, TIN=1), a step 1602. The OS also sets THERM SPR3=1.

Data processor 10 then waits until control unit 300 generates an interrupt. If control unit 300 generates an interrupt based on THRESHOLD$_H$ (THERM SPR1), a step 1604, then the OS increases the THRESHOLD$_H$, a step 1606. If control unit 300 generates an interrupt based on THRESHOLD$_L$ (THERM SPR2), a step 1608, then the OS decreases the THRESHOLD$_L$, a step 1610. If control unit 300 does not generate either interrupt, then the OS decreases THRESHOLD$_H$ and/or increases THRESHOLD$_L$, a step 1612. This step narrows the difference window.

After steps 1606, 1610, and 1612, the OS determines if the difference between the current values of THRESHOLD$_H$ and THRESHOLD$_L$ is less than the resolution of temperature sensor 314. If the difference between THRESHOLD$_H$ and THRESHOLD$_L$ is less than the resolution of temperature sensor 314, then the OS declares the temperature to be some predetermined function of THRESHOLD$_H$ and THRESHOLD$_L$. For instance, the temperature may be one or the other of THRESHOLD$_H$ and THRESHOLD$_L$, may be the average of the two, etc. If the difference between THRESHOLD$_H$ and THRESHOLD$_L$ is not less than the resolution of temperature sensor 314, then OS returns to step 1600 to continue comparing THRESHOLD$_H$ and THRESHOLD$_L$ to the temperature of data processor 10.

III. Instruction Issue Control

A. Hardware description

Figure 17:
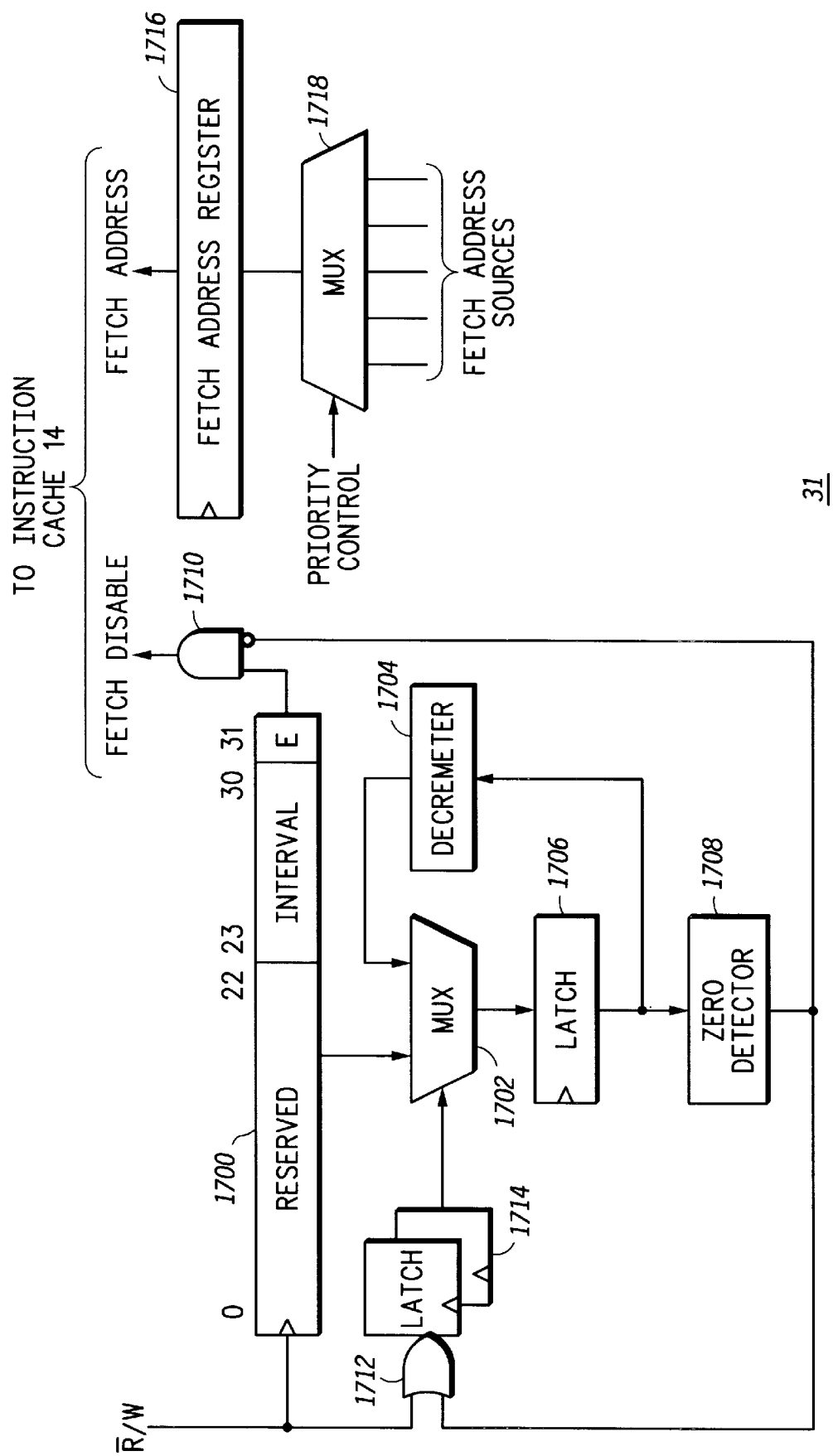
FIG. 17 depicts a block diagram of the issue control logic depicted in FIG. 1.

FIG. 17 depicts a block diagram of issue control logic 31 depicted in FIG. 1. A first output of a special purpose register 1700 is connected to a first input of a 2:1 multiplexer (MUX) 1702. A second input of MUX 1702 is connected to an output of a decrementer 1704. An output of MUX 1702 is connected to an input of a latch 1706. An output of latch 1706 is coupled to an input of decrementer 1704 and to an input of a zero detector 1708. An output of zero detector 1708 is connected to an inverting input of an AND gate 1710 and to a first input of an OR gate 1712. A second input of OR gate 1712 receives a register read/write control signal ($\overline{R/W}$). An output of OR gate 1712 is coupled to an input of a latch 1714. A second output of register 1700 is connected to a non-inverting input of AND gate 1710. An output of AND gate 1710 generates the control signal FETCH DISABLE. An output of latch 1712 generates a MUX select signal.

An input of a fetch address register 1716 receives an output of a R:1 multiplexer (MUX) 1718, where R is a non-zero integer. MUX 1718 receives R fetch address sources from various portions of data processor 10. An output of AND gate 1710 and an output of fetch address register 1716 are connected to instruction cache 14. Instruction cache 14 supplies instructions beginning at the address specified by fetch address register 1716 to sequencer unit 18 unless the control signal FETCH DISABLE is asserted. In the preferred embodiment, data processor 10 is a RISC style data processor. Therefore, there are various sources of the fetch address generated each cycle: a sequential address calculator, a branch prediction mechanism, branch unit 20, interrupt/exception handler circuitry, etc. Circuitry (not shown) selects which of the inputs to MUX 1718 should be forwarded to instruction cache 14.

Register 1700 is visible to the user of data processor 10 to control the power and thermal management functions described herein. Register 1700 contains two data fields: INTERVAL and ENABLE (E). The INTERVAL field is an eight bit field that is used to specify the number of machine cycles required between successive fetches of instructions from instruction cache 14. The E field enables the delay when E=1. Instruction fetching is not affected by the INTERVAL field when E=0.

B. Operational description

As described above, there are instances in which it is desirable to reduce the power consumed by data processor 10. One way to limit the power consumed by data processor 10 is to limit the rate at which instructions are fetched from instruction cache 14. This strategy limits the rate of read accesses to instruction cache 14 and limits the rate at which instructions are executed by the various execution units 19, 20, 22, 24, 26, 28, and 30.

To limit the number of instructions fetched by instruction cache 14, a user or an OS writes a non-zero value to register 1700 and sets the ENABLE bit. Latch 1714 initially selects the INTERVAL output from REGISTER 1700 when a value is written to register 1700 and read/write control signal ($\overline{R/W}$) is asserted. MUX 1702, latch 1704, and decrementer 1706 decrement the INTERVAL one value per machine cycle. While the output of latch 1706 is non-zero, AND gate 1710 asserts a FETCH DISABLE control signal and instruction cache 14 does not supply instructions to sequencer unit 18. Once MUX 1702, latch 1704, and decrementer 1706 decrement the INTERVAL to zero, AND gate 1710 de-asserts the FETCH DISABLE control signal and instruction cache 14 fetches instructions at the address output by fetch address register 1716.

Latch 1714 selects the INTERVAL output from register 1700 after zero detector 1708 detects that the output of decrementer 1706 is zero. The throttling of instruction issue is continued until the ENABLE bit is cleared or until INTERVAL=0.

The degree of instruction throttling can be tailored by varying the value stored in the INTERVAL field. For instance, to moderately limit the rate at which instructions are fetched from instruction cache 14, a small number may be stored into register 1700. To severely limit the rate at which instructions are fetched from instruction cache 14, a large number may be stored into register 1700.

IV. Thermal Sensor

A. Hardware description

Figure 18:
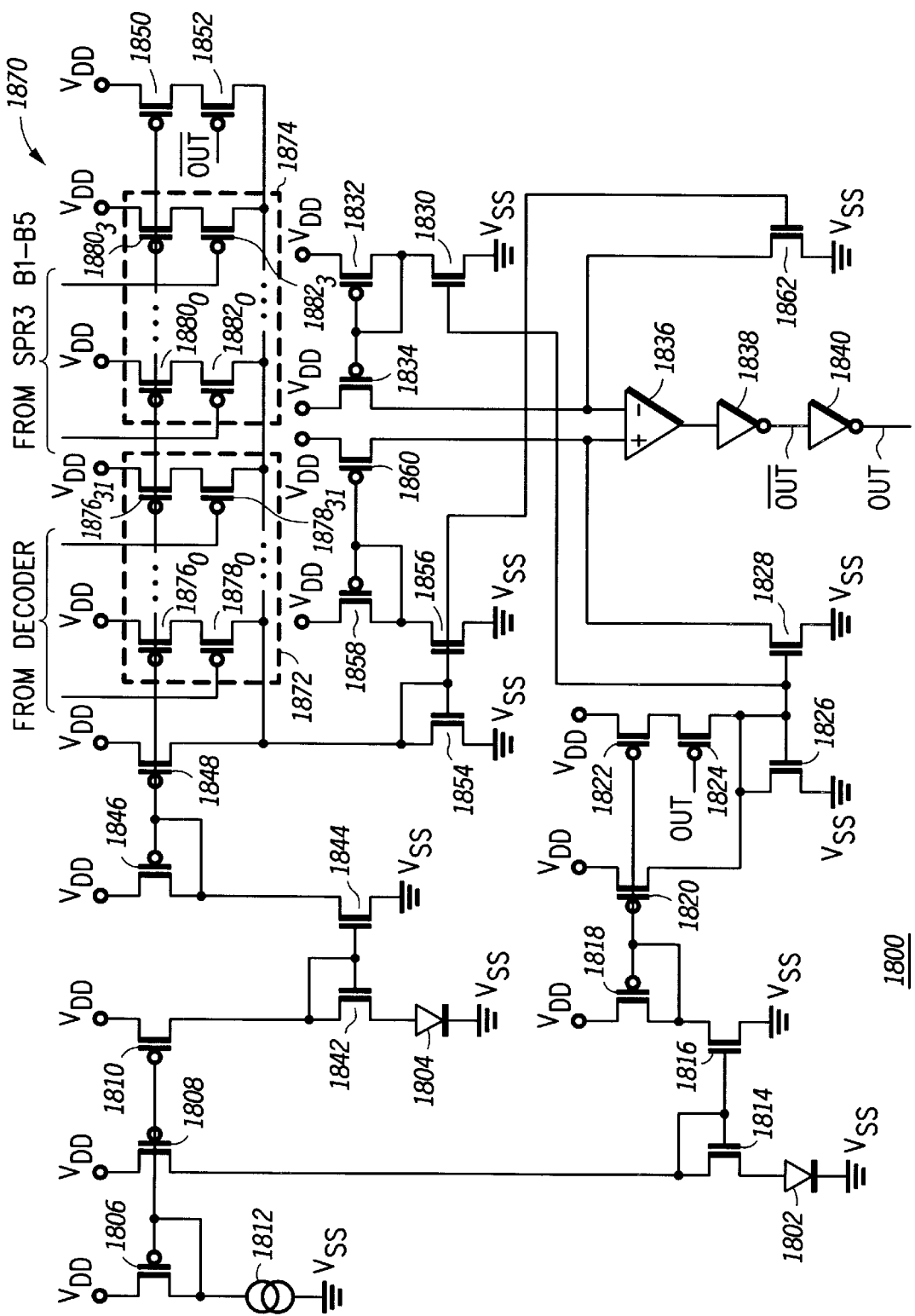
FIG. 18 depicts a partial block, partial schematic diagram of the temperature sensor depicted in FIG. 3.

FIG. 18 depicts a partial block, partial schematic diagram of a temperature sensor 1800 depicted in FIG. 3. Temperature sensor 1800 comprises a first diode 1802 and a second diode 1804 to generate two currents whose difference is a predictable function of temperature. In one embodiment of the invention, diode 1802 is thirty-three times larger than diode 1804. The natural logarithm of this ratio increases the gain of the sensor by a like amount. Consequently, a voltage difference between the two diodes can be measured and converted into useful information. Specifically, the two voltages are converted to two currents. One of the currents is then modulated by a digital to analog converter. Finally, the two currents are fed to an analog current comparator. The output of the analog current comparator may be buffered by an inverter, etc.

Generally, the voltage drop ($V_d$) across a diode is a function of size of the diode (A), the current flowing through the diode (I), the saturation current density of the diode ($J_S$), the temperature of the diode in degrees Kelvin (T), the charge of the electron (q) and Boltzman's constant (K):

$$V_d = \frac{KT}{q} * \ln\left(\frac{I}{J_S A}\right).  \quad \text{Equation (1)}$$

The voltage across the diode changes linearly with temperature. This relationship is also useful because the relative voltage difference across two diodes is a function of the relative sizes of the two diodes as well as temperature:

$$\delta V_d = \frac{KT}{q} * \ln\left(\frac{I_1 A_2}{I_2 A_1}\right) \quad \text{Equation (2)}$$

where the numeric subscripts 1 and 2 refer to the first and the second diode, respectively.

Continuing with FIG. 18, a first current electrode of each of three p-type transistors 1806, 1808, and 1810 receives a first voltage supply, $V_{DD}$. A control electrode of each of transistors 1806, 1808, and 1810 is coupled together and to a first terminal of a current source 1812. A second current electrode of transistor 1806 is coupled to the first terminal of current source 1812. A second terminal of current source 1812 receives a second voltage supply, $V_S$.

A second current electrode of transistor 1808 is coupled to a first current electrode and to a control electrode of an n-type transistor 1814 and to a control electrode of an n-type transistor 1816. A second current electrode of transistor 1814 is coupled to a first terminal of diode 1802. A second terminal of diode 1802 receives the second voltage supply, $V_{SS}$. A first current electrode of transistor 1816 is coupled to a first current electrode and to a control electrode of a p-type transistor 1818. A second current electrode of transistor 1816 receives the second voltage supply, $V_{SS}$. A second current electrode of transistor 1818 receives the first voltage supply, $V_{DD}$. The control electrode of transistor 1818 is coupled to a control electrode of each of two p-type transistors 1820 and 1822. A first current electrode of each of transistors 1820 and 1822 receive the first voltage supply, $V_{DD}$. A second current electrode of transistor 1822 is connected to a first current electrode of a p-type transistor 1824. A control electrode and a second current electrode of transistor 1824 receives a final output signal OUT and is connected to a first current electrode of an n-type transistor 1826, respectively. A second current electrode of transistor 1820 is also connected to the first current electrode of transistor 1826. The first current electrode of transistor 1826 is coupled to its control electrode and to a control electrode of each of two n-type transistors 1828 and 1830. A second current electrode of each of transistors 1826, 1828, and 1830 receive the second voltage supply, $V_{SS}$.

A first current electrode of transistor 1828 is connected to a positive (+) terminal of a voltage gain stage 1836. A first current electrode of transistor 1830 is connected to a first current electrode and a control electrode of a p-type transistor 1832 and to a control electrode of a p-type transistor 1834. A first current electrode of transistor 1834 is coupled to a negative (−) terminal of voltage gain stage 1836. A second current electrode of each of transistors 1832 and 1834 receive the first voltage supply, $V_{DD}$.

An output operational amplifier is buffered by two serially connected inverters 1838 and 1840. An output of inverter 1838 generates an intermediate output signal $\overline{OUT}$. An output of inverter 1840 generates a final output signal OUT.

Returning to transistor 1810, a second current electrode of transistor 1810 is coupled to a first current electrode and to a control electrode of an n-type transistor 1842 and to a control electrode of an n-type transistor 1844. A second current electrode of transistor 1842 is coupled to a first terminal of diode 1804. A second terminal of diode 1804 receives the second voltage supply, $V_{SS}$. A first current electrode of transistor 1844 is coupled to a first current electrode and to a control electrode of a p-type transistor 1846. A second current electrode of transistor 1844 receives the second voltage supply, $V_{SS}$. A second current electrode of transistor 1846 receives the first voltage supply, $V_{DD}$. The control electrode of transistor 1846 is coupled to a control electrode of each of two p-type transistors 1848 and 1850. A first current electrode of each of transistors 1848 and 1850 receive the first voltage supply, $V_{DD}$. A second current electrode of transistor 1850 is connected to a first current electrode of a p-type transistor 1852. A control electrode and a second current electrode of transistor 1852 receives the intermediate output signal $\overline{OUT}$ and is connected to a first current electrode of an n-type transistor 1854, respectively. A second current electrode of transistor 1848 is also connected to the first current electrode of transistor 1854. The first current electrode of transistor 1854 is coupled to its control electrode and to a control electrode of an n-type transistor 1856. A second current electrode of transistor 1854 and a first current electrode of transistor 1856 receive the second voltage supply, $V_{SS}$.

A second current electrode of transistor 1856 is connected to a first current electrode and to a control electrode of a p-type transistor 1858. A second current electrode of transistor 1858 receives the first voltage supply, $V_{DD}$. The control electrode of transistor 1858 is also connected to a control electrode of a p-type transistor 1860. A first current electrode and a second electrode of transistor 1860 receive the first voltage supply, $V_{DD}$ and are connected to the positive (+) terminal of voltage gain stage 1836, respectively. A first current electrode, a second electrode, and a control electrode of a transistor 1862 is connected to the negative (−) terminal of voltage gain stage 1836, receives the second voltage supply, $V_{SS}$, and is connected to the control electrode of transistor 1856, respectively.

As described above in connection with FIG. 3, temperature sensor 314 contains a digital to analog converter 316. The conceptual representation of FIG. 3, is indicated in FIG. 18 by the numeral 1870. Digital to analog converter 1870 comprises a sensing portion 1872 and a calibrating portion 1874. Sensing portion 1872 is used to modulate the current indirectly output by diode 1804. When this output is equal to the current indirectly output by diode 1802, then the temperature of the thermal sensor can be determined. Calibrating portion 1874 is used to supply a fixed current to transistor 1854 to compensate for the variations caused by the process used to manufacture data processor 10.

Continuing with sensing portion 1872, 32 pairs of p-type transistors are connected in series between the supply voltage, $V_{DD}$, and the first current electrode of transistor 1854. In particular, a first current electrode, a control electrode, and a second current electrode of a p-type transistor $\mathbf{1876_i}$ is connected to the supply voltage $V_{DD}$, to the control electrode of transistor 1846, and to a first current electrode of a transistor 1878$_i$, respectively, where i is an integer index ranging from 0 to 31. A control electrode and a second current electrode of transistor 1878$_i$ is connected to receive the ith output of decoder 312 (depicted in FIG. 3) and to the current electrode of transistor 1854, respectively. In the preferred embodiment, there are 32 individual switches in sensing portion 1872. One skilled in the art will readily appreciate that the number may be varied to suit the particular application and the desired resolution of the application in which temperature sensor 1800 is incorporated.

Continuing with calibrating portion 1874, four pairs of p-type transistors are connected in series between the supply voltage, V$_{DD}$, and the first current electrode of transistor 1854. In particular, a first current electrode, a control electrode, and a second current electrode of a p-type transistor 1880$_j$ is connected to the supply voltage V$_{DD}$, to the control electrode of transistor 1846, and to a first current electrode of transistor 1882$_j$, respectively, where j is an integer index ranging from 0 to 3. A control electrode and a second current electrode of transistor 1882$_j$ is connected to receive a jth one of the calibrating bits (depicted in FIG. 4) and to the first current electrode of transistor 1854, respectively. One skilled in the art will readily appreciate that the number may be varied to suit the particular application and the desired resolution of the application in which temperature sensor 1800 is incorporated.

B. Operational description

Current source 1812 generates a current that is mirrored by transistors 1806, 1808, and 1810 to diodes 1802 and 1804. This current causes a voltage drop across diodes 1802 and 1804 that is a predictable function of the temperature. The difference between these two voltages is further amplified by the natural logarithm of the ratio of the sizes of diode 1802 to 1804.

The voltage drop across diode 1804 is level shifted by transistor 1842, converted into a current by transistors 1844 and 1846, and modulated by the inputs to digital to analog converter 1870. Finally, the modulated output of digital to analog converter 1870 is sourced to the positive (+) terminal of voltage gain stage 1836 and sunk from the negative (−) terminal of voltage gain stage 1836.

The voltage drop across diode 1802 is also level shifted and converted into a current. Here, the voltage drop across diode 1802 is level shifted by transistor 1814 and is converted into a current by transistors 1816 and 1818. This current is sunk from the positive (+) terminal of voltage gain stage 1836 and sourced to the negative (−) terminal of voltage gain stage 1836.

The voltages present on and currents flowing through the drains of transistors 1816 and 1844 are themselves a function of temperature. Starting from basic principles, $$\delta I \equiv I_{1844} - I_{1816}, \quad \text{Equation (3)}$$

where I$_{1816}$ and I$_{1844}$ can be expanded:

$$I_{1816} = Q_{1816}(V_{gs,1816} - V_{t,1816})^2, \quad \text{Equation (4)}$$

and $$I_{1844} = Q_{1844}(V_{gs,1844} - V_{t,1844})^2, \quad \text{Equation (5)}$$

where $$V_{gs,1816} = V_{d,1802} + V_{t,1816} + \sqrt{I/Q}, \quad \text{Equation (6)}$$

$$V_{gs,1844} = V_{d,1804} + V_{t,1844} + \sqrt{I/Q}, \quad \text{Equation (7)}$$

$$Q = \mu(T) * C_{ox} * w/(2l), \quad \text{Equation (8)}$$

where the subscripts "gs" and "t" refer to the gate-to-source and threshold voltages, respectively, where $\mu(T)$ is the electron mobility, where $C_{OX}$ is the oxide capacitance, where w is the width of the control electrode, and where l is the length of the control electrode of a particular transistor. The electron mobility is proportional to temperature, $T^{-3/2}$.

Continuing with the analysis and assuming that transistors 1816 and 1844 are identical, Equations (3) through (7) reduce to $$\delta I = Q[(V_{d,1802} + V_{t,1816} + \sqrt{I/Q} - V_{t,1816})^2 - \\ (V_{d,1804} + V_{t,1844} + \sqrt{I/Q} - V_{t,1844})^2], \quad \text{Equation (9)}$$

or $$\delta I = Q[(V_{d,1802} + \sqrt{I/Q})^2 - (V_{d,1804} + \sqrt{I/Q})^2]. \quad \text{Equation (10)}$$

By definition, $$\delta V \equiv V_{d,1804} - V_{d,1802} \quad \text{Equation (11)}$$

or $$V_{d,1802} = V_{d,1804} - \delta V. \quad \text{Equation (12)}$$

Substituting Equation (12) into Equation (10) yields:

$$\delta I = Q[(V_{d,1804} - \delta V + \sqrt{I/Q})^2 - (V_{d,1804} + \sqrt{I/Q})^2] \quad \text{Equation (13)}$$

which reduces to $$\delta I = Q\delta V^2 - 2Q\delta VK, \quad \text{Equation (14)}$$

where, $$K = V_{d,1804} + \sqrt{I/Q}. \quad \text{Equation (15)}$$

K is very weakly dependent upon temperature. δV, however, varies with temperature as the function T and Q varies with temperature as the function $T^{-3/2}$ (electron mobility). Consequently, δI varies with temperature as the function $\sqrt{T}$.

Transistors 1822, 1824, 1850, and 1852 provide stability to the operation of temperature sensor 1800 by providing a hysteresis effect. After the output of voltage gain stage 1836 trips from positive to negative, transistor 1824 will be placed into a conductive state, sourcing a small amount of current to the negative (−) terminal and sinking the same small amount of current from the positive terminal (+) of voltage gain stage 1836. Conversely, after the output of voltage gain stage 1836 trips from negative to positive, transistor 1852 will be placed into a conductive state, sourcing a small amount of current to the positive (+) terminal and sinking the same small amount of current from the negative terminal (−) of voltage gain stage 1836. These additional currents will inhibit voltage gain stage 1836 from inadvertently flipping its output when its inputs are close to each other.

The sizes and number of transistors 1876$_i$ are determined by the previous equations or empirically by simulating the expected diode voltages. In particular, the diode voltage of diodes 1802 and 1804 are modeled at a particular minimum expected temperature. From this model, a certain minimum voltage difference is predicted. This voltage difference is converted to a current difference and is matched by a certain number(s) of transistors 1876$_i$ in digital to analog converter 1870. This particular transistor(s) is always on. From the minimum expected temperature, incremental temperatures are modeled, generating incremental voltage differences and incremental current differences. These incremental currents are matched with individual incremental transistors 1876$_i$. The desired granularity of temperature detection determines the number of incremental temperature calculations that are performed. Transistors 1876$_i$ may be used in combination with each other to reduce the total number of transistor pairs required.

The sizes and number of transistors 1880$_j$ are also determined empirically. Here, the expected process comers and the corresponding diode voltages are simulated. Process comers define the expected range of physical variations caused by the manufacturing process used to fabricate data processor 10. In particular, the diode voltage of diodes 1802 and 1804 are modeled at each process corner. From this model, a range of possible currents is predicted. This range is matched by a certain number of transistors 1880$_j$ in digital to analog converter 1870 that can generate a range of matching currents. Transistors 1880$_j$ are to be used in combination with each other to reduce the total number of transistor pairs required. A user or an OS determines which transistors should be enabled to compensate for the particular process variations resulting after a particular thermal sensor is manufactured. Such a calculation is performed by sensing a known temperature, inputting the control signals corresponding to the known temperature to sensing portion 1872, and enabling or disabling transistors 1882$_j$ until the output of temperature sensor 1800 indicates the expected value. The inclusion of calibrating portion 1870 ensures that the sensing portion 1878 will operate correctly over its entire expected temperature range independent of manufacturing variations.

C. Second embodiment

In a second embodiment of the present invention, transistors 1816 and 1844 are "natural transistors." A natural transistor is one whose threshold voltage equals zero ($V_t=0$). In this embodiment, the control electrodes of transistors 1816 and 1844 are connected directly to the first terminal of diode 1802 and to the first terminal of diode 1804, respectively. Transistors 1814 and 1842 are omitted altogether. In this embodiment, the voltage difference between diode 1802 and 1804 is only a function of temperature and diode size. Process variations do not influence one portion of temperature sensor 1800 any more than any other portion.

Although the present invention has been described with reference to a specific embodiment, further modifications and improvements will occur to those skilled in the art. For instance, the disclosed invention is described as a dual ended temperature sensor for noise immunity purposes. However, the present invention may be incorporated into a single-ended design for those applications in which noise immunity is not critical. In a single-ended design, operational amplifier 1836 would be replaced by an inverter. As such, only the transistor 1860 and 1828 would be connected to the input of the inverter. Transistors 1830, 1832, 1834, and 1862 would be unnecessary. It is to be understood therefore, that the invention encompasses all such modifications that do not depart from the spirit and scope of the invention as defined in the appended claims.

What is claimed is:

1. A temperature sensor comprising:

a first diode having a first area and generating a first voltage; and a second diode having a second area and generating a second voltage;

a first voltage-to-current converter responsive to the first diode; and a second voltage-to-current converter responsive to the second diode.

2. The temperature sensor of claim 1 further comprising:

a voltage level shifter responsive to the first diode.

3. The temperature sensor of claim 2 further comprising compare circuitry responsive to the first and second voltage-to-current converters and generating an output signal responsive to the difference of the first and second current.

4. The temperature sensor of claim 3 further comprising a digital to analog converter modulating the first current responsive to a received input.

5. The temperature sensor of claim 4 further comprising a hysteresis switching circuit responsive to a predetermined value of the output signal.

6. The temperature sensor of claim 3 further comprising a hysteresis switching circuit responsive to a predetermined value of the output signal.

7. The temperature sensor of claim 4 wherein the digital to analog converter further comprises a sensing portion and a calibrating portion.

8. The temperature sensor of claim 1, wherein the first and second voltage-to-current converters have a common node.

9. The temperature sensor of claim 8, wherein the common node is coupled to a voltage supply.

10. A temperature sensor integrated on a circuit for comparing a predetermined temperature threshold to a temperature of the integrated circuit, comprising:

a first diode having a first area and generating a first voltage;

a first zero-threshold transistor comprising a first current electrode, a second current electrode, and a first control electrode, the first control electrode receiving the first voltage, the first current electrode generating a first current;

a second diode having a second area and generating a second voltage;

a second zero-threshold transistor comprising a third current electrode, a fourth current electrode, and a second control electrode, the second control electrode receiving the second voltage, the third current electrode generating a second current; and compare circuitry generating an output signal responsive to the difference of the first and second current.

11. The temperature sensor of claim 8 further comprising a digital to analog converter modulating the first current responsive to a received input.

12. The temperature sensor of claim 11 wherein the digital to analog converter further comprises a sensing portion and a calibrating portion.

13. The temperature sensor of claim 12 further comprising a hysteresis switching circuit sourcing a predetermined current to the compare circuitry responsive to a predetermined value of the output signal.

14. The temperature sensor of claim 11 further comprising a hysteresis switching circuit sourcing a predetermined current to the compare circuitry responsive to a predetermined value of the output signal.

15. The temperature sensor of claim 10 further comprising a hysteresis switching circuit sourcing a predetermined current to the compare circuitry responsive to a predetermined value of the output signal.

* * * * *